United States Patent
Kroeger

(10) Patent No.: US 8,307,756 B1
(45) Date of Patent: Nov. 13, 2012

(54) TIME-TO-CLEAN-FILTER INDICATOR SYSTEM FOR A POPCORN POPPING MACHINE AND METHOD

(75) Inventor: Daniel R. Kroeger, Cincinnati, OH (US)

(73) Assignee: Gold Medal Products Company, Cincinnati, OH (US)

( * ) Notice: Subject to any disclaimer, the term of this patent is extended or adjusted under 35 U.S.C. 154(b) by 913 days.

(21) Appl. No.: 11/685,332

(22) Filed: Mar. 13, 2007

Related U.S. Application Data

(60) Provisional application No. 60/747,737, filed on May 19, 2006.

(51) Int. Cl.
*A23L 1/18* (2006.01)

(52) U.S. Cl. .......................... 99/323.7; 99/323.4; 99/328

(58) Field of Classification Search .................. 99/323.5, 99/323.7; 426/231, 233, 523; 73/861.56, 73/861.57, 313, 321; 340/606, 607, 624, 340/539.1, 539.26, 618
See application file for complete search history.

(56) References Cited

U.S. PATENT DOCUMENTS

| | | | | |
|---|---|---|---|---|
| 3,930,996 A * | 1/1976 | Day et al. | ................... | 209/139.1 |
| 4,459,584 A * | 7/1984 | Clarkson | ........................ | 340/624 |
| 5,871,792 A * | 2/1999 | Weiss et al. | ................... | 426/233 |
| 6,338,279 B1* | 1/2002 | Tsataros | .................... | 73/861.56 |
| 2006/0144245 A1* | 7/2006 | Rhome | ........................ | 99/323.5 |
| 2006/0277928 A1* | 12/2006 | McDougal et al. | ............... | 62/66 |
| 2007/0261162 A1* | 11/2007 | Atkinson | ........................ | 4/623 |
| 2008/0190825 A1* | 8/2008 | Hengsperger et al. | ........... | 210/95 |

\* cited by examiner

*Primary Examiner* — Henry Yuen
*Assistant Examiner* — Jianying Atkisson
(74) *Attorney, Agent, or Firm* — Wood, Herron & Evans, LLP

(57) ABSTRACT

An indicator system for use with a popcorn popping machine providing a sensory perceptible signal to a user that ventilation filters should be cleaned. The indicator system may automatically track an interval based on a prior filter cleaning or usage of the popcorn popping machine.

10 Claims, 4 Drawing Sheets

TIME-TO-CLEAN-FILTER INDICATOR SYSTEM FOR A POPCORN POPPING MACHINE AND METHOD

RELATED APPLICATIONS

The present application claims the filing benefit of U.S. Provisional Application Ser. No. 60/747,737, filed May 19, 2006, the disclosure of which is incorporated herein by reference in its entirety.

TECHNICAL FIELD

The present invention relates generally to popcorn popping machines and, more particularly, to an improved user interface.

BACKGROUND

Popcorn is mass-produced for sale at movies and other events in commercial popcorn popping machines which include an enclosed transparent cabinet containing a tiltable kettle suspended above a catch area or platform. The kettle is heated, and uncooked popcorn kernels are placed therein with oil and popped. Once the kernels are popped, the kettle is either manually or automatically tilted to dump the popped popcorn onto the platform to be scooped up, packaged and sold to customers.

In the popping process, steam, smoke, oil vapors and other hot cooking gases are produced; and in the absence of ventilation, the cooking gases flow out through a user access door, which can be uncomfortable for the user. Therefore, known popcorn popping machines contain a powered ventilation system that pulls and ventilates the cooking gases from the machine interior through an upper wall of the machine. Further, to reduce the amount particulate matter and odors that are ventilated into the ambient environment around the machine, the cooking gases pass through one or more stages of filtration, for example, a metal mesh filter, a paper filter, a carbon filter, etc.

As with most filters, it is necessary to clean the filters after a period of use. However, it has been observed that many users of popcorn popping machines do not clean the filters on a regular basis, thereby substantially reducing the effectiveness of the machine ventilation system. Further, a high rate of turnover of personnel, for example, at movie concession stands, makes additional training of dubious value. Further, those who are under contract to clean the theatres often also have a high turnover and cleaning popcorn popping machine filters is outside their normal areas of responsibility.

Therefore, there is a need for an improved popcorn popping machine that provides a greater awareness of a requirement to clean popcorn popping machine ventilation filters.

SUMMARY

The present invention may overcome the foregoing and other shortcomings and drawbacks of ventilation filter systems heretofore known for a popcorn popping machine. While the invention will be described in connection with certain embodiments, it will be understood that the invention is not limited to these embodiments. On the contrary, the invention includes all alternatives, modifications and equivalents as may be included within the spirit and scope of the present invention.

In one embodiment, an indicator system for use with a popcorn popping machine provides a sensory perceptible signal to a user that ventilation filters should be cleaned. The indicator system may automatically track an interval from a prior filter cleaning, and at an appropriate time, provide the signal to the user. Further, the indicator system may track an interval based on usage of the popcorn popping machine. Therefore, the interval may be directly related to a generation of cooking gases and thus, use of the ventilation filters.

In another aspect, a method of operating a popcorn popping machine provides a sensory perceptible signal representing an instruction to clean the ventilation filter. The signal may be produced in response to detecting an interval since a prior cleaning of the ventilation filter.

The above and other objects and advantages of the present invention shall be made apparent from the accompanying drawings and the description thereof.

BRIEF DESCRIPTION OF THE DRAWINGS

The accompanying drawings, which are incorporated in and constitute a part of this specification, illustrate embodiments of the invention and, together with a general description of the invention given above, and the detailed description of the embodiments given below, serve to explain the principles of the invention.

DETAILED DESCRIPTION

Figure 1:
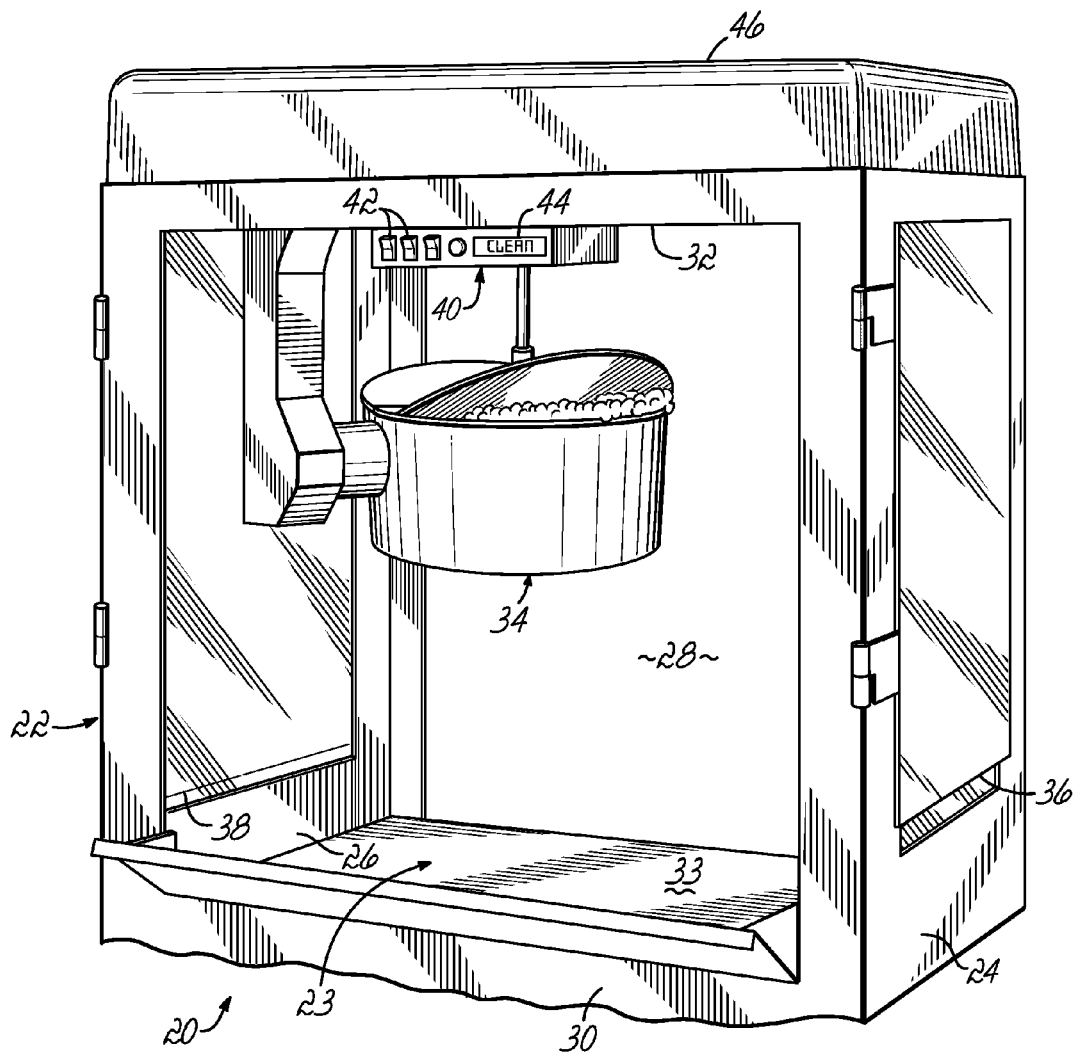
FIG. 1 is a perspective view of an exemplary embodiment of a popcorn popping machine incorporating an indicator system in accordance with the principles of the present invention.

Referring now to the figures, and to FIG. 1 in particular, an exemplary popcorn popping machine 20 is shown according to one embodiment of the present invention. It will be appreciated that the popping machine 20 is operable to cook or pop popcorn and is particularly useful for cooking consecutive batches of popcorn for sale by concessionaires at movie theatres, sports events, fairs and the like.

The popping machine 20 includes a cabinet 22 having an enclosable interior 23 surrounded by two sidewalls 24, 26, a rear wall 28, a front wall 30, a top wall 32 and a bottom wall 33. The front wall 30 includes two doors 36, 38 that can be opened to gain access to the kettle 34 as well as popped popcorn in the machine interior 23. Sidewalls 24, 26 and rear wall 28, as well as the front wall 30 including doors 36, 38, are all often made of transparent glass or plastic material so that the cabinet interior 23 can be viewed from the exterior. The cabinet 22 may also include one or more user interface panels 40 that support various operating switches 42 and visual displays 44, for example, light indicators, alphanumeric displays, etc., which are used to operate the popcorn popping machine 20. A popping kettle 34 is of any suitable variety and is mounted inside the cabinet 22. The kettle 34 is tiltable either automatically or manually in a known manner to dump popped popcorn upon completion of a popping cycle.

Figure 2:
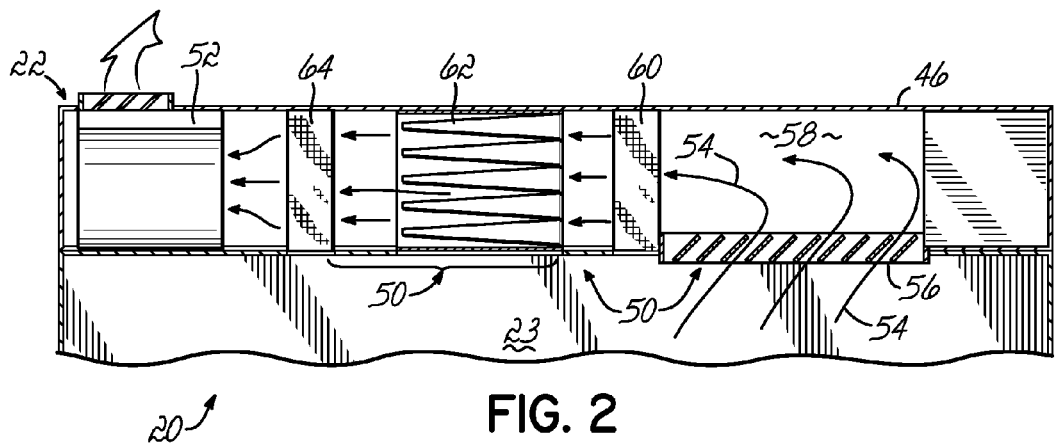
FIG. 2 is a cross-sectional schematic drawing of an exemplary embodiment of a ventilation system of the type often used with the popcorn popping machine of FIG. 1.

During operation of the popcorn popping machine 20, a popcorn cooking or popping cycle may often produce several pounds of cooking by-products, for example, steam, oil vapor, smoke and other cooking gases as well as associated popping particulates. In the absence of a ventilation system, of those heated, cooking by-products escape the cabinet interior 23 upon a user opening the doors 36, 38. To reduce a user's exposure to such cooking by-products, as shown in FIG. 2, a popping machine 20 often has a ventilation system 50 located in an upper portion of 46. The ventilation system 50 is powered by a event fan 52. Operation of the fan 52 creates during a cooking cycle, a ventilation path of 54 for removing cooking by-products from the machine interior 23. The ventilation system 50 further includes a filter system 55 that is the embodiment of FIG. 2 is multi-stage filter system that includes three removable filters 60, 62, 64. The first filter 60 is often a metallic mesh filter that defines a tortuous path for the cooking vapors and is effective to remove oil droplets. A second filter stage 62 is often a medium filter, for example, a commercially available "bag" filter, and may be a polyester media filter commercially available from Airguard of Louisville, Ky. The final filter stage 64 is often a finer filter and may be a carbon filter or a hypoallergetic filter known as a "HEPA" filter. In operation, the fan 52 pulls cooking by-products through opening in a vent cover 56, into a plenum 58, through the filters system 55 and vents the filtered air through an opening in a top of the cabinet. The above ventilation system 50 is very effective at removing cooking by-products from the cabinet interior 23 and returning reasonably clean air to an ambient environment.

As with most filters, it is necessary to clean or replace one or more of the filters 60, 62, 64 after a period of use. While such filter cleaning instructions are provided to users through various sources, such cleaning instructions are often ignored, which reduces the effectiveness of the ventilation system 50. Thus, it would be helpful to provide the user with some sensory perceptible signal, for example, an audible or visual signal, instructing or prompting the user to clean the filters.

In one exemplary embodiment, the time between recommended filter cleanings can be measured by usage of the popping machine 20, and usage can be measured in terms of a number of cooking or popping cycles processed in the popping machine 20. As can be seen from FIG. 3, popcorn popping cycles have a predictable and repeatable temperature-time relationship. More specifically, referring also to FIG. 4, upon a user activating a kettle heat switch 100 to initiate a popping cycle, a temperature controller 102 operates a relay 104 to apply power from a source 106 to a kettle heater 108. The temperature of the kettle 34 is monitored by a thermocouple 110 that provides a temperature-related feedback signal to the temperature controller 102. As shown at 150 in FIG. 3, the kettle temperature quickly rises to a point 152 at which the popcorn and oil are added to the kettle 34. The popcorn and oil absorb heat causing the kettle temperature 34 to quickly drop as indicated at 154. The heater 108 again raises the temperature as shown at 156 to a desired popping temperature of 158. That predictable and repeatable relationship of temperature versus time in a popcorn popping cycle can be used to identify and count popping cycles.

Figure 3:
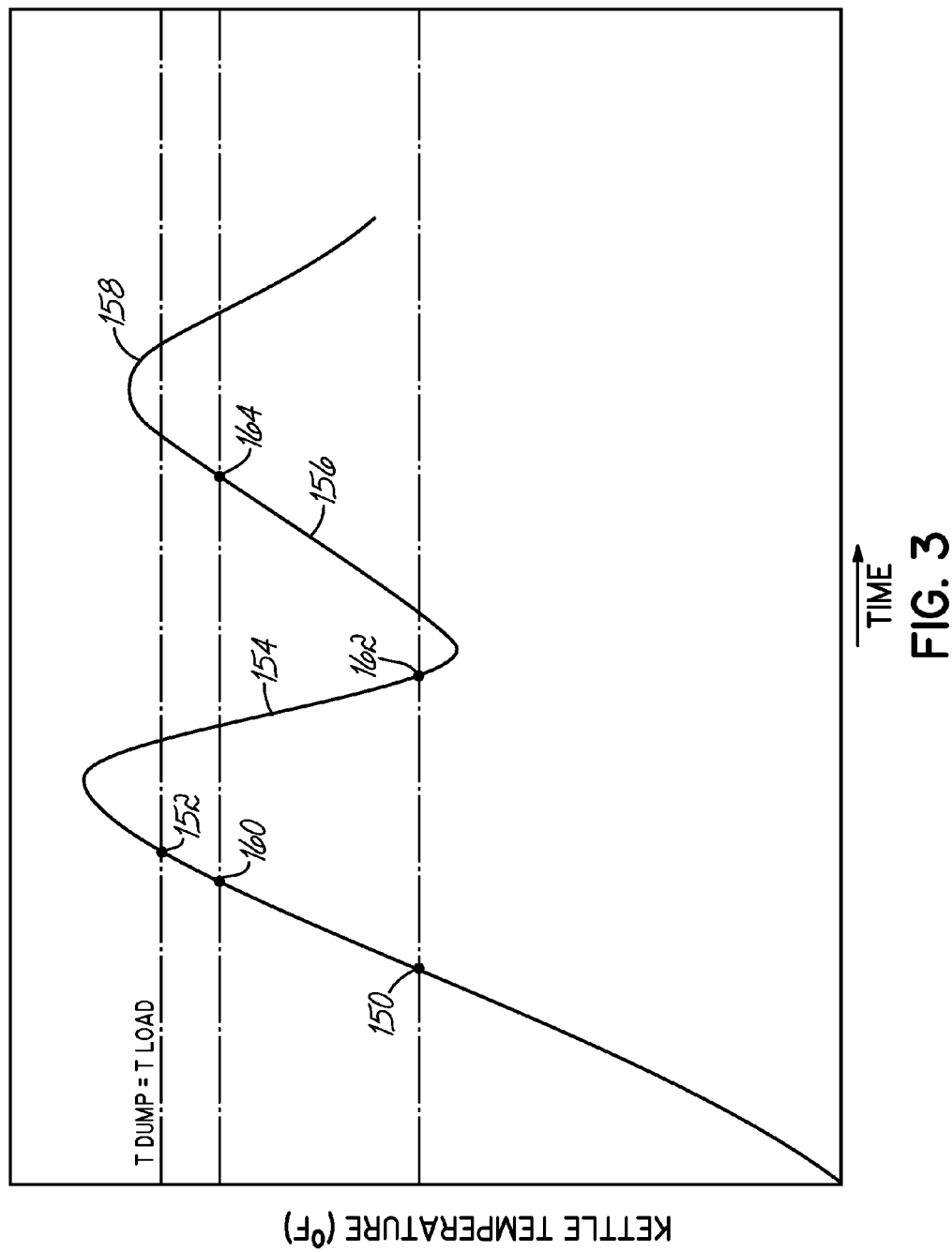
FIG. 3 is a graphical representation of temperature versus time of a kettle during a popcorn cooking cycle.
Figure 4:
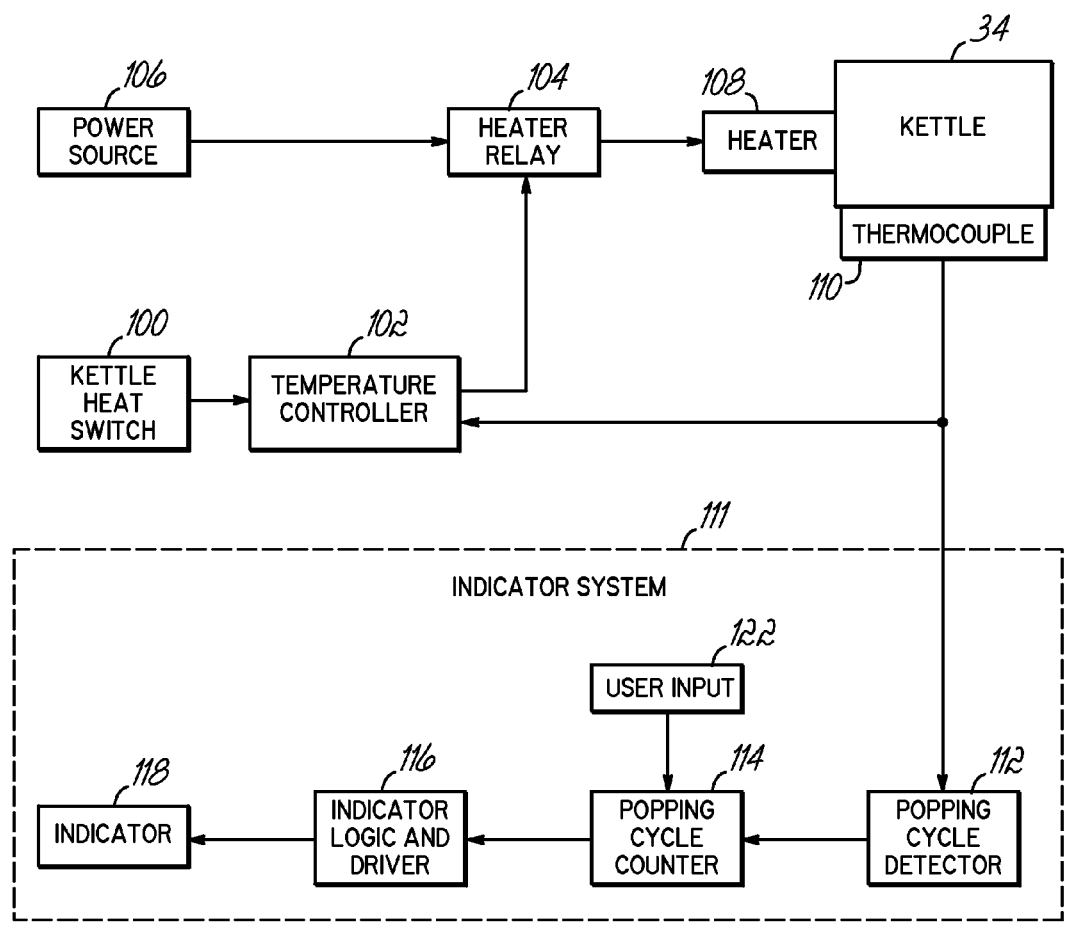
FIG. 4 is a schematic block diagram of a control circuit for implementing the indicator system of FIG. 1.

In one exemplary embodiment, referring to FIG. 4, an indicator system 111 has a popping cycle detector 112 that monitors the output of thermocouple 110 and tracks the temperature time relationship of FIG. 3 with respect to temperature set points. For example, the popping cycle detector 112 monitors the output of the thermocouple 110 to detect when the temperature exceeds a first temperature set point, for example, 400 degrees F., as indicated at 160 in FIG. 3. In a normal popping cycle, the kettle temperature will peak and then drop upon the oil and unpopped corn being loaded therein. The popping cycle detector 112 is effective to detect when the kettle temperature drops below a second temperature set point, for example, 350 degrees F., as indicated at 162. The continued operation of the kettle heater 108 again raises the kettle temperature, and the popping cycle detector 112 is effective to detect when the kettle temperature again exceeds the first temperature set point as indicated at 164. Upon detecting the kettle temperature again rising above the first temperature set point, the popping cycle detector increments a popping cycle counter 114.

The number of popping cycles between filter cleanings will vary depending on the size of the popcorn popping machine 20 and the types of filters used in the filter system 55. Generally, the cleaning interval is determined by the manufacturer of the popping machine 20 and often is a chosen to be a weekly interval. Generally, over a week's usage in many commercial applications, the popcorn popping machine 20 will be run through about 100-150 popping cycles. Therefore, an indicator logic and driver 116 monitors the count in the popping cycle counter 114; and when the popping cycle counter 114 reaches a preset popping cycle interval, for example, 125 popping cycles, the indicator logic and driver 116 provides an output activating a sensory perceptible indicator 118. The indicator 118 may provide an audible signal, for example, a chime, ring, buzz, etc., or visual signal, for example, an LED, an illuminated light, an alphanumeric or graphic display, etc., or combinations of audible and visual signals.

Figure 5:
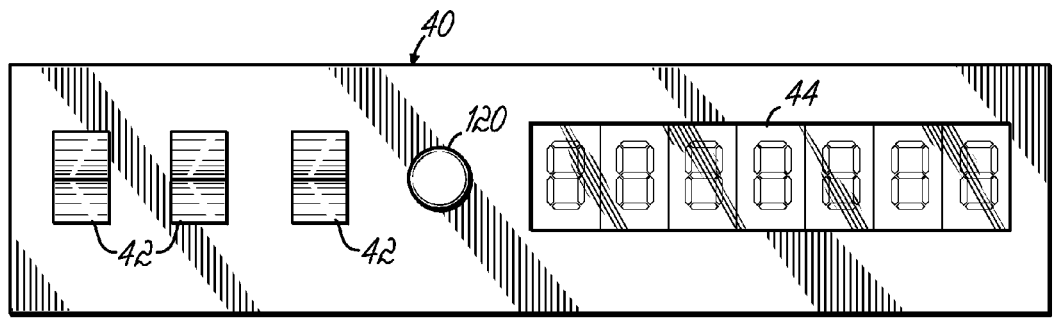
FIG. 5 is a schematic diagram of a user interface implementing the indicator system of FIG. 1.
Figure 6A:
FIGS. 6A-6D are a series of displays illustrating the messages provided by the user interface of FIG. 5.
Figure 6B:
Figure 6C:
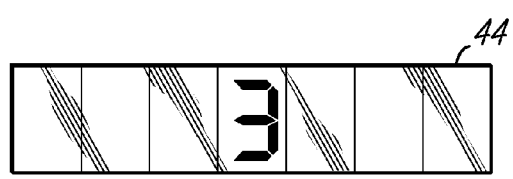
Figure 6D:

As shown in FIG. 5, one exemplary embodiment of a user interface panel 40 includes on/off switches 42, a push button 120 and a multiple character visual display 44, for example, a seven segment alphanumeric display. In the current example, the indicator 118 is the alphanumeric display 44. The indicator logic and driver 116 of FIG. 4 is effective to cause the alphanumeric display 44 to sequentially display the word messages shown in FIGS. 6A-6B, that is, "clean all 3 filters". The push button 120 in FIG. 5 is one embodiment of the user input 122 in the indicator system 111 of FIG. 4. The push button 120 may be depressed once to command the indicator logic and driver 116 change the indicator 118, for example, the alphanumeric display 44, to display kettle temperature. Depressing the push button 120 again will toggle the alphanumeric display back to the message of sequential words "clean all 3 filters". Further, depressing the push button 120 for a sustained period of about five seconds will cause the indicator logic and driver 116 to stop displaying message of sequential words "clean all 3 filters"; however, the popping cycle counter 114 will continue to count popping cycles. If the filters are cleaned, the user can depress the push button 120 for about ten seconds to reset the popping cycle counter 114, thereby beginning a measurement of another interval until the next recommended filter cleaning.

While the present invention has been illustrated by the description of an exemplary embodiment thereof, and while the embodiment has been described in considerable detail, it is not intended to restrict or in any way limit the scope of the appended claims to such detail. Additional advantages and modifications will readily appear to those skilled in the art. For example, in the described embodiment, the indicator 118 is an alphanumeric seven segment display of seven characters; however, in alternative embodiments, the alphanumeric display may be any number of characters, for example, three, four, five or six characters. In still further embodiments, the alphanumeric display may be implemented using an LED display.

In yet further embodiments, upon the indicator logic and driver 116 producing an output signal upon detecting a desired popping cycle count indicating that the filters should be cleaned, that output signal can be used to inhibit further popping cycles until the filters are cleaned.

The invention in its broader aspects is therefore not limited to the specific details, representative apparatus and methods and illustrative examples shown and described. Accordingly, departures may be made from such details without departing from the scope or spirit of Applicants' general inventive concept.

What is claimed is:

1. An apparatus for use with a popcorn popping machine, the popcorn popping machine comprising a cabinet with a closable interior, a ventilation filter for removing cooking vapors from the interior, a kettle mounted in the closable interior for popping popcorn, a heater for heating the kettle, a temperature sensor providing a feedback signal representing the temperature of the kettle and a thermal controller for controlling the heater in response to the temperature feedback signal, the apparatus comprising:

an indicator system producing a sensory perceptible signal representing an instruction to clean the ventilation filter, the signal being produced in response to the indicator system detecting a predetermined number of popping cycles processed in the popcorn popping machine since a prior cleaning of the ventilation filter, wherein the indicator system comprises a popping cycle detector responsive to the temperature feedback signal provided by the temperature sensor and providing an output signal in response to each cycle of operation of the heater representing a popping cycle and a popping cycle counter connected to the popping cycle detector and being responsive to the output signal provided by popping cycle detector to count the number of popping cycles.

2. The apparatus of claim 1 wherein the indicator system further comprises a visually perceptible signal.

3. The apparatus of claim 1 wherein the indicator system further comprises a driver connected to the popping cycle counter for generating the visually perceptible signal in response to the counter counting a number of popping cycles.

4. The apparatus of claim 1 wherein the indicator system further comprises a multicharacter alphanumeric display.

5. The apparatus of claim 4 wherein the multicharacter alphanumeric display displays a message comprising alphanumeric characters.

6. The apparatus of claim 4 wherein the popcorn popping machine comprises multiple ventilation filters and the multicharacter alphanumeric display displays a message comprising alphanumeric characters.

7. The apparatus of claim 1 wherein the indicator system further comprises an audibly perceptible signal.

8. A method of operating a popcorn popping machine comprising a cabinet with a closable interior, a ventilation filter for removing cooking vapors from the interior, a kettle mounted in the closable interior for popping popcorn, a heater for heating the kettle, a temperature sensor providing a feedback signal representing the temperature of the kettle, a thermal controller for controlling the heater in response to the temperature feedback signal and an indicator system, the method comprising:

detecting by a popping cycle detector, in response to the temperature feedback signal provided by the temperature sensor, a cycle of operation of the heater representing a popping cycle;

providing an output signal by the popping cycle detector in response to each cycle of operation of the heater representing a popping cycle;

counting each popping cycle by a popping cycle counter, wherein the popping cycle counter is connected to the popping cycle detector and is responsive to the output signal provided by popping cycle detector; and generating a sensory perceptible signal by the indicator system representing an instruction to clean the ventilation filter, the signal being produced in response to the indicator system detecting a predetermined number of popping cycles processed in the popcorn popping machine since a prior cleaning of the ventilation filter.

9. The method of claim 8 further comprising generating a visually perceptible signal.

10. The method of claim 9 wherein the visually perceptible signal is a message comprising alphanumeric characters.

* * * * *